United States Patent
Slocum et al.

(10) Patent No.: US 12,275,516 B1
(45) Date of Patent: Apr. 15, 2025

(54) STABILIZATION AND REINFORCEMENT OF BALLOONS DURING RAPID FILLING

(71) Applicant: LTAG SYSTEMS LLC, Bow, NH (US)

(72) Inventors: Jonathan T. Slocum, Bow, NH (US); Alexander H. Slocum, Bow, NH (US)

(73) Assignee: LTAG SYSTEMS LLC, Bow, NH (US)

( * ) Notice: Subject to any disclaimer, the term of this patent is extended or adjusted under 35 U.S.C. 154(b) by 0 days.

(21) Appl. No.: 18/583,732

(22) Filed: Feb. 21, 2024

Related U.S. Application Data (60) Provisional application No. 63/447,231, filed on Feb. 21, 2023.

(51) Int. Cl.
*B64B 1/58* (2006.01)
*B01J 7/00* (2006.01)
*B64F 1/04* (2006.01)

(52) U.S. Cl.
CPC .............. *B64B 1/58* (2013.01); *B01J 7/00* (2013.01); *B64F 1/04* (2013.01)

(58) Field of Classification Search
CPC .... B64B 1/58; B64B 1/62; B64B 1/64; A63H 27/10; A63H 27/085; A63H 3/06; A63H 2027/1033; A63H 2027/1041; A63H 2027/1075; A63H 2027/1083; E04H 15/20; E04H 15/22; E04H 2015/20;

(Continued)

(56) References Cited

U.S. PATENT DOCUMENTS 1,206,867 A * 12/1916 Lewis ............... G09B 27/08
434/138
1,614,117 A   1/1927 Geldhof
(Continued)

FOREIGN PATENT DOCUMENTS

CA        2800795 A1    3/2013
CN     101198737 A    6/2008
(Continued)

OTHER PUBLICATIONS

"Can Dimensions—Twin monkeys Beverage Canning Systems," https://twinmonkeys.neVcan-dimensions/ retrieved on Apr. 5, 2021 (2021).

(Continued)

*Primary Examiner* — Joshua J Michener
*Assistant Examiner* — Colin Zohoori
(74) *Attorney, Agent, or Firm* — The Marbury Law Group, PLLC (57) ABSTRACT

According to one aspect, a system for launching an aircraft may include an inflatable structure including a balloon and a neck collectively defining a volume; a drain valve including a funnel and a stem coupled to one another, the funnel defining a cavity at least partially disposed in the volume of the inflatable structure, the stem defining a channel and a slot in fluid communication with one another and with the cavity; a coupling defining a first orifice, a second orifice, and a passage therebetween, the passage in fluid communication with the neck of the inflatable structure via the first orifice; and a pin releasably positionable in the slot, the pin in the slot controlling position of the funnel relative to the first orifice defined by the coupling.

17 Claims, 4 Drawing Sheets

(58) Field of Classification Search
CPC .. E04H 2015/201202; E04H 2015/204; E04H 2015/206; E04H 2015/208
USPC .................................................. 446/220–226
See application file for complete search history.

(56) References Cited

U.S. PATENT DOCUMENTS

| | | | |
|---|---|---|---|
| 2,384,720 A | 9/1945 | Babcock et al. | |
| 3,014,689 A | 12/1961 | Soderstrom | |
| 3,117,424 A | 1/1964 | Hebenstreit | |
| 3,118,465 A | 1/1964 | Scaramucci | |
| 3,204,320 A | 9/1965 | Eckstein et al. | |
| 3,270,920 A | 9/1966 | Nessler | |
| 3,381,655 A | 5/1968 | Rozzelle | |
| 3,402,738 A | 9/1968 | Perolo | |
| 3,460,746 A * | 8/1969 | Forsythe | F04F 5/461 |
| | | | 417/174 |
| 3,502,298 A | 3/1970 | Paddington | |
| 3,514,076 A | 5/1970 | Wheatley | |
| 3,549,123 A | 12/1970 | Bell et al. | |
| 3,554,707 A | 1/1971 | Holmes et al. | |
| 3,575,381 A | 4/1971 | Gilmore | |
| 3,878,081 A | 4/1975 | Reding et al. | |
| 3,993,595 A | 11/1976 | Merkl | |
| 4,049,158 A | 9/1977 | Lo et al. | |
| 4,084,711 A | 4/1978 | Armstrong | |
| 4,133,513 A | 1/1979 | Meyer | |
| 4,134,491 A | 1/1979 | Turillon et al. | |
| 4,239,277 A | 12/1980 | Oda | |
| 4,264,018 A | 4/1981 | Warren | |
| 4,280,288 A | 7/1981 | Corfa et al. | |
| 4,358,291 A | 11/1982 | Cuomo et al. | |
| 4,446,636 A | 5/1984 | Weinert | |
| 4,586,456 A | 5/1986 | Forward | |
| 4,770,848 A | 9/1988 | Ghosh et al. | |
| 4,944,242 A | 7/1990 | Russell | |
| 4,982,929 A | 1/1991 | Spurling | |
| 4,998,708 A | 3/1991 | Pavanel | |
| 5,137,179 A | 8/1992 | Stoffel | |
| 5,152,501 A | 10/1992 | Raymond, Jr. | |
| 5,240,449 A | 9/1993 | Sloan | |
| 5,284,182 A | 2/1994 | McLennan | |
| 5,301,631 A | 4/1994 | Vining | |
| 5,372,617 A | 12/1994 | Kerrebrock et al. | |
| 5,456,492 A | 10/1995 | Smith et al. | |
| 5,494,538 A | 2/1996 | Kirillov et al. | |
| 5,533,751 A | 7/1996 | Kort et al. | |
| 5,555,839 A | 9/1996 | Staten et al. | |
| 5,605,481 A | 2/1997 | Van Raden | |
| 5,620,652 A | 4/1997 | Tack et al. | |
| 5,707,499 A | 1/1998 | Joshi et al. | |
| 5,732,752 A | 3/1998 | Glessner et al. | |
| 6,386,137 B1 | 5/2002 | Riche | |
| 6,506,360 B1 | 1/2003 | Andersen et al. | |
| 6,638,493 B2 | 10/2003 | Andersen et al. | |
| 6,648,272 B1 | 11/2003 | Kothmann | |
| 7,147,004 B1 | 12/2006 | Hartman | |
| 7,344,267 B2 | 3/2008 | Carito | |
| 7,356,930 B2 | 4/2008 | Wadge et al. | |
| 7,364,815 B2 | 4/2008 | Nakagawa et al. | |
| 7,503,277 B2 | 3/2009 | Boschma, Jr. et al. | |
| 7,540,892 B2 | 6/2009 | Strizki et al. | |
| 7,588,087 B2 | 9/2009 | Cafferata | |
| 7,666,386 B2 | 2/2010 | Withers-Kirby et al. | |
| 7,803,349 B1 | 9/2010 | Muradov | |
| 7,871,036 B2 | 1/2011 | Zubrin et al. | |
| 8,157,205 B2 | 4/2012 | McWhirk | |
| 8,161,996 B2 | 4/2012 | Barker et al. | |
| 8,225,927 B2 | 7/2012 | Narendrnath et al. | |
| 8,418,435 B2 | 4/2013 | Hatoum | |
| 8,430,704 B2 | 4/2013 | Jeffrey | |
| 8,522,835 B2 | 9/2013 | McLean et al. | |
| 8,579,158 B2 | 11/2013 | Rice | |
| 8,697,027 B2 | 4/2014 | Uzhinsky et al. | |
| 8,864,064 B2 | 10/2014 | DiMarzio et al. | |
| 8,974,765 B2 | 3/2015 | Boyle et al. | |
| 9,090,323 B1 | 7/2015 | Ratner | |
| 9,174,140 B2 | 11/2015 | Nelson et al. | |
| 9,346,532 B1 | 5/2016 | Ratner | |
| 9,511,844 B1 | 12/2016 | DeVaul | |
| 9,619,977 B2 | 4/2017 | Graham et al. | |
| 9,624,103 B1 | 4/2017 | Woodall et al. | |
| 9,853,360 B2 | 12/2017 | Sylvia et al. | |
| 9,902,480 B1 | 2/2018 | Cromie et al. | |
| 10,113,534 B2 | 10/2018 | Sia | |
| 10,236,930 B1 | 3/2019 | Ferraro | |
| 10,258,950 B2 | 4/2019 | Kmetich et al. | |
| 10,556,709 B1 | 2/2020 | Kimchi et al. | |
| 10,612,683 B2 | 4/2020 | Clayton et al. | |
| 10,737,754 B1 | 8/2020 | Farley et al. | |
| 10,745,789 B2 | 8/2020 | Slocum | |
| 10,787,268 B2 | 9/2020 | Leidich et al. | |
| 10,829,192 B1 | 11/2020 | Farley et al. | |
| 10,829,229 B2 | 11/2020 | MacCallum et al. | |
| 10,988,227 B2 | 4/2021 | MacCallum et al. | |
| 10,995,680 B2 | 5/2021 | Tanaka et al. | |
| 11,047,162 B1 | 6/2021 | Tennessee | |
| 11,111,141 B1 | 9/2021 | Slocum et al. | |
| 11,130,557 B1 | 9/2021 | Slocum et al. | |
| 11,141,671 B2 | 10/2021 | Harter et al. | |
| 11,142,318 B2 | 10/2021 | Thrun et al. | |
| 11,148,947 B1 | 10/2021 | Slocum et al. | |
| 11,203,430 B2 | 12/2021 | Heppe | |
| 11,268,180 B2 | 3/2022 | Slocum | |
| 11,287,050 B2 | 3/2022 | VanLaningham et al. | |
| 11,312,466 B1 | 4/2022 | Slocum et al. | |
| 11,318,437 B1 | 5/2022 | Slocum et al. | |
| 11,332,366 B2 | 5/2022 | Slocum et al. | |
| 11,661,339 B1 | 5/2023 | Mahar et al. | |
| 11,738,849 B1 | 8/2023 | Slocum et al. | |
| 11,772,062 B1 | 10/2023 | Slocum et al. | |
| 11,772,795 B1 * | 10/2023 | Slocum | B64C 39/024 |
| 11,958,585 B1 | 4/2024 | Slocum et al. | |
| 11,964,748 B1 * | 4/2024 | Slocum | B64B 1/62 |
| 12,134,456 B1 * | 11/2024 | Slocum | B64B 1/64 |
| 12,139,403 B1 | 11/2024 | Slocum et al. | |
| 12,187,405 B1 | 1/2025 | Slocum et al. | |
| 2002/0088178 A1 | 7/2002 | Davis | |
| 2003/0024323 A1 | 2/2003 | Wang et al. | |
| 2003/0062444 A1 * | 4/2003 | Goodey | B64B 1/62 |
| | | | 244/24 |
| 2003/0235724 A1 | 12/2003 | Ord et al. | |
| 2004/0016613 A1 | 1/2004 | Uemura | |
| 2006/0278757 A1 | 12/2006 | Kelleher | |
| 2007/0057116 A1 | 3/2007 | Sinsabaugh et al. | |
| 2007/0217972 A1 | 9/2007 | Greenberg et al. | |
| 2008/0063597 A1 | 3/2008 | Woodall et al. | |
| 2008/0121778 A1 | 5/2008 | Imajou | |
| 2008/0193806 A1 | 8/2008 | Kulakov | |
| 2009/0127137 A1 | 5/2009 | Golz et al. | |
| 2009/0208404 A1 | 8/2009 | Itoh | |
| 2010/0028255 A1 | 2/2010 | Hatoum | |
| 2010/0038477 A1 | 2/2010 | Kutzmann et al. | |
| 2010/0061923 A1 | 3/2010 | Reddy | |
| 2010/0068132 A1 | 3/2010 | Vencill et al. | |
| 2010/0112396 A1 | 5/2010 | Goldstein | |
| 2010/0200693 A1 | 8/2010 | Zubrin et al. | |
| 2010/0230121 A1 | 9/2010 | Hall et al. | |
| 2010/0276537 A1 | 11/2010 | Kutzmann et al. | |
| 2012/0052001 A1 | 3/2012 | Woodall et al. | |
| 2012/0100443 A1 | 4/2012 | Braithwaite et al. | |
| 2012/0107228 A1 | 5/2012 | Ishida et al. | |
| 2012/0318660 A1 | 12/2012 | Cohly et al. | |
| 2013/0004865 A1 | 1/2013 | Stimits et al. | |
| 2013/0028809 A1 | 1/2013 | Barton et al. | |
| 2013/0115544 A1 | 5/2013 | Davidson et al. | |
| 2013/0219795 A1 | 8/2013 | Fukumoto | |
| 2013/0248748 A1 | 9/2013 | Baumann | |
| 2014/0050625 A1 | 2/2014 | Zheng et al. | |
| 2014/0075847 A1 | 3/2014 | Konchan | |
| 2014/0097289 A1 | 4/2014 | Heppe | |
| 2014/0231132 A1 | 8/2014 | Watanabe | |
| 2014/0231281 A1 | 8/2014 | Young et al. | |
| 2014/0261132 A1 | 9/2014 | Zeren et al. | |

(56) References Cited

U.S. PATENT DOCUMENTS

| | | |
|---|---|---|
| 2015/0204486 A1 | 7/2015 | Hoffmann |
| 2015/0258298 A1 | 9/2015 | Satoh et al. |
| 2016/0207605 A1 | 7/2016 | Jensen et al. |
| 2016/0257415 A1 | 9/2016 | Ye et al. |
| 2016/0289917 A1 | 10/2016 | Sakamoto |
| 2016/0355918 A1 | 12/2016 | Slocum |
| 2017/0022075 A1 | 1/2017 | Ritchie et al. |
| 2017/0022078 A1 | 1/2017 | Fukuoka |
| 2017/0355460 A1 | 12/2017 | Shannon et al. |
| 2017/0355462 A1 | 12/2017 | Hoheisel |
| 2018/0237141 A1 | 8/2018 | Heppe |
| 2018/0272898 A1 | 9/2018 | Wojatzki et al. |
| 2018/0274272 A1 | 9/2018 | Woo et al. |
| 2018/0280743 A1 | 10/2018 | Walker |
| 2018/0296935 A1* | 10/2018 | Mowbray ............. A63H 27/10 |
| 2019/0024216 A1 | 1/2019 | Giri et al. |
| 2019/0077510 A1 | 3/2019 | Panas et al. |
| 2019/0079509 A1 | 3/2019 | Bosworth |
| 2019/0193913 A1 | 6/2019 | Takehara |
| 2019/0201642 A1 | 7/2019 | Takehara |
| 2019/0226247 A1 | 7/2019 | Johann et al. |
| 2019/0341637 A1 | 11/2019 | Fine et al. |
| 2020/0088178 A1 | 3/2020 | Fukudome et al. |
| 2020/0115024 A1* | 4/2020 | Anderson ................ B64B 1/64 |
| 2020/0156790 A1 | 5/2020 | Von Flotow et al. |
| 2020/0199727 A1 | 6/2020 | Slocum |
| 2020/0199728 A1 | 6/2020 | Slocum |
| 2020/0262536 A1 | 8/2020 | Deakin |
| 2020/0325045 A1 | 10/2020 | Fukuoka |
| 2021/0011492 A1 | 1/2021 | Raabe et al. |
| 2021/0061488 A1 | 3/2021 | Smithers et al. |
| 2021/0080010 A1 | 3/2021 | Klein |
| 2021/0115547 A1 | 4/2021 | Slocum |
| 2021/0237843 A1 | 8/2021 | Slocum et al. |
| 2021/0276865 A1 | 9/2021 | Meroueh |
| 2021/0276866 A1 | 9/2021 | Meroueh |
| 2022/0041262 A1 | 2/2022 | Slocum et al. |
| 2022/0074023 A1 | 3/2022 | Godart |
| 2023/0002026 A1 | 1/2023 | Limpaecher et al. |
| 2023/0150701 A1 | 5/2023 | Yartha et al. |
| 2023/0159149 A1 | 5/2023 | Slocum et al. |

FOREIGN PATENT DOCUMENTS

| | | |
|---|---|---|
| CN | 103608957 A | 2/2014 |
| CN | 204034673 U | 12/2014 |
| CN | 104291268 A | 1/2015 |
| CN | 109678109 A | 4/2019 |
| CN | 113124170 A | 7/2021 |
| EP | 1975479 A2 | 10/2008 |
| EP | 2980352 A1 | 2/2016 |
| FR | 2194391 A1 | 10/2008 |
| GB | 2226619 A1 | 7/1990 |
| GB | 2356184 A | 5/2001 |
| GB | 2525372 A | 10/2015 |
| JP | 2004174301 A | 6/2004 |
| JP | 2004243151 A | 9/2004 |
| JP | 2009221097 A | 10/2009 |
| RU | 2131841 C1 | 6/1999 |
| WO | 2009034479 A2 | 3/2009 |
| WO | 2011040942 A1 | 4/2011 |
| WO | 2015005921 A1 | 1/2015 |
| WO | WO2015077225 A1 | 5/2015 |
| WO | 2016196718 A1 | 12/2016 |
| WO | WO202134805 A1 | 2/2021 |
| WO | 2021119628 A1 | 6/2021 |

OTHER PUBLICATIONS

"Fundamentals of Adhesion," edited by Lieng-Huang Lee, pp. 333-336 (1991).

Ansara et al. "Thermodynamic Analysis of the Ga—In, Al—GA, Al—In and the Al—Ga—In Systems," Calphad, vol. 2, No. 3, pp. 187-196 (1978).

Chao, et al., "Maximized On-Demand Hydrogen Generator Design," Advanced Materials Research vols. 690-693, pp. 954-961 (2013).

Choi et al. "Mechanism of Hydrogen Generation via Water Reaction with Aluminum Alloys," Generating hydrogen on demand, Jun. 28, 2010, (4 pages).

Godart, Peter, "Design of an Aluminum-Powered Reverse Osmosis Desalination System for Disaster Relief," Massachusetts Institute of Technology, Dept. of Mechanical Engineering May 22, 2019 (105 pages).

Godart, Peter, "Mechanisms of Liquid-Metal-Activated Aluminum-Water Reactions and Their Application," Massachusetts Institute of Technology, Dept. of Mechanical Engineering, Aug. 6, 2021 (351 pages).

Lee, Lieng-Huang (edited) Fundamentals of Adhesion, pp. 333-336 (1991).

Merouh, Laureen, "Effects of Doping and Microstructural Variables on Hydrogen Generated Via Aluminum-Water Reactions Enabled By a Liquid Metal," Ph.D. Thesis, Massachusetts Institute of Technology, Sep. 2020.

Metals Handbook, Tenth Edition, vol. 2, Properties and Selection: Nonferrous Alloys and Special-Purpose Materials, Oct. 1990, pp. 146-146.

Parmuzina et al. "Oxidation of Activated aluminum with water as a method of hydrogen generation," Russian Chemical Bulletin, International Edition, vol. 58, No. 3, pp. 493-989 (Mar. 2009).

Rajagopalan et al. "atomic-scale analysis of liquid-gallium embrittlement of aluminum grain boundaries," Acta Materialia, vol. 73, pp. 312-325 (Jul. 2014).

Vitos et al. "The Surface Energy of Metals," Elsevier Surface Science 411, pp. 186-202 (1998).

Wan et al. "Review of Solid State recyling of aluminum chips," Elsevier, Resources, Conservation & Recycling 125 (2017) pp. 37-47.

Wikipedia, "USS Macon (ZRS-5)," Feb. 24, 2023 (10 pages).

Supp. Search Report in EP 16804381.8 dated Oct. 26, 2018 (7 pages).

ISR&WO in PCT/US16/35397 dated Sep. 7, 2016 (14 pages).

IPRP in PCT/US16/35397 dated Dec. 14, 2017 (12 pages).

U.S. Patent and Trademark Office, "Non-Final Office Action," issued in related U.S. Appl. No. 16/804,676 dated Jul. 21, 2021 (17 pages).

U.S. Patent and Trademark Office, "Notice of Allowance and Fee(s) Due," issued in related U.S. Appl. No. 16/804,676 dated Jan. 25, 2022 (25 pages).

U.S. Patent and Trademark Office, "Restriction Requirement," issued in related U.S. Appl. No. 17/014,593 dated Dec. 8, 2020 (7 pages).

U.S. Patent and Trademark Office, "Notice of Allowance and Fee(s) Due," issued in related U.S. Appl. No. 17/014,593 dated Jan. 22, 2021 (19 pages).

U.S. Patent and Trademark Office, "Notice of Allowance and Fee(s) Due," issued in related U.S. Appl. No. 17/014,593 dated Jun. 3, 2021 (15 pages).

U.S. Patent and Trademark Office, "Restriction Requirement," issued in related U.S. Appl. No. 17/233,781 dated Aug. 11, 2022 (5 pages).

U.S. Patent and Trademark Office, "Non-Final Office Action," issued in related U.S. Appl. No. 17/233,781 dated Sep. 26, 2022 (24 pages).

U.S. Patent and Trademark Office, "Final Office Action," issued in related U.S. Appl. No. 17/233,781 dated Apr. 3, 2023 (8 pages).

U.S. Patent and Trademark Office, "Notice of Allowance and Fee(s) Due," issued in related U.S. Appl. No. 18/346,683 dated Apr. 10, 2024 (11 pages).

U.S. Patent and Trademark Office, "Notice of Allowance and Fee(s) Due," issued in related U.S. Appl. No. 18/346,683 dated May 31, 2024 (23 pages).

U.S. Patent and Trademark Office, "Notice of Allowance and Fee(s) Due," issued in related U.S. Appl. No. 18/346,683 dated Aug. 26, 2024 (14 pages).

U.S. Patent and Trademark Office, "Notice of Allowance and Fee(s) Due," issued in related U.S. Appl. No. 17/115,437 dated May 12, 2021 (24 pages).

(56) References Cited

OTHER PUBLICATIONS

U.S. Patent and Trademark Office, "Non-Final Office Action," issued in related U.S. Appl. No. 17/463,836 dated May 25, 2023 (41 pages).
U.S. Patent and Trademark Office, "Notice of Allowance and Fee(s) Due," issued in related U.S. Appl. No. 17/463,836 dated Mar. 19, 2024 (8 pages).
U.S. Patent and Trademark Office, "Notice of Allowance and Fee(s) Due," issued in related U.S. Appl. No. 17/463,836 dated Jul. 16, 2024 (27 pages).
U.S. Patent and Trademark Office, "Notice of Allowance and Fee(s) Due," issued in related U.S. Appl. No. 17/535,008 dated Dec. 8, 2022 (30 pages).
U.S. Patent and Trademark Office, "Notice of Allowance and Fee(s) Due," issued in related U.S. Appl. No. 17/535,008 dated Apr. 19, 2023 (14 pages).
U.S. Patent and Trademark Office, "Notice of Allowance and Fee(s) Due," issued in related U.S. Appl. No. 17/535,008 dated Aug. 11, 2023 (17 pages).
U.S. Patent and Trademark Office, "Notice of Allowance and Fee(s) Due," issued in related U.S. Appl. No. 17/535,008 dated Nov. 30, 2023 (14 pages).
U.S. Patent and Trademark Office, "Notice of Allowance and Fee(s) Due," issued in related U.S. Appl. No. 17/586,759 dated May 24, 2023 (26 pages).
U.S. Patent and Trademark Office, "Notice of Allowance and Fee(s) Due," issued in related U.S. Appl. No. 17/586,759 dated Sep. 6, 2023 (15 pages).
U.S. Patent and Trademark Office, "Notice of Allowance and Fee(s) Due," issued in related U.S. Appl. No. 17/586,759 dated Jan. 24, 2024 (17 pages).
U.S. Patent and Trademark Office, "Restriction Requirement," issued in related U.S. Appl. No. 17/865,201 dated Sep. 12, 2022 (6 pages).
U.S. Patent and Trademark Office, "Non-Final Office Action," issued in related U.S. Appl. No. 17/865,201 dated Nov. 25, 2022 (15 pages).
U.S. Patent and Trademark Office, "Non-Final Office Action," issued in related U.S. Appl. No. 17/865,201 dated Jul. 3, 2023 (23 pages).
U.S. Patent and Trademark Office, "Final Office Action," issued in related U.S. Appl. No. 17/865,201 dated Jan. 24, 2024 (10 pages).
U.S. Patent and Trademark Office, "Advisory Action," issued in related U.S. Appl. No. 17/865,201 dated Apr. 22, 2024 (3 pages).
U.S. Patent and Trademark Office, "Non-Final Office Action," issued in related U.S. Appl. No. 17/865,201 dated Aug. 26, 2024 (21 pages).
U.S. Patent and Trademark Office, "Notice of Allowance and Fee(s) Due," issued in related U.S. Appl. No. 18/110,352 dated Mar. 13, 2024 (20 pages).
U.S. Patent and Trademark Office, "Notice of Allowance and Fee(s) Due," issued in related U.S. Appl. No. 18/110,352 dated Jun. 20, 2024 (17 pages).

* cited by examiner

STABILIZATION AND REINFORCEMENT OF
BALLOONS DURING RAPID FILLING

CROSS-REFERENCE TO RELATED
APPLICATIONS

This application claims priority to U.S. Prov. App. Ser. No. 63/447,231, filed Feb. 21, 2023, the entire contents of which are hereby incorporated herein by reference.

BACKGROUND

Balloons can be filled with a lifting gas to allow the balloon to float in any one or more of various, different media. As an example, balloons in the form of weather balloons are commonly used for meteorological observation. Such weather balloons provide localized weather conditions that may not be accurately measurable using ground-based measurements or satellite images.

The types of applications in which balloons are useful are, however, constrained by the resources and quality of lifting gases required to impart buoyancy to balloons. That is, the time and equipment required for inflation can make balloons unsuitable for many implementations in the field, away from established infrastructure. Further, the performance of balloons can be significantly impacted by composition of the lifting gas itself, resulting in suboptimal—or at least unpredictable—flight of the balloon as composition of the lifting gas and/or environmental conditions change during the course of a given flight.

Accordingly, there remains a need for making balloon inflation and flight more robust across a variety of field conditions, while using equipment and resources amenable to transport and rapid deployment.

SUMMARY

According to one aspect, a system for launching an aerostat may include an inflatable structure including a balloon and a neck collectively defining a volume, a drain valve including a funnel and a stem coupled to one another, the funnel defining a cavity at least partially disposed in the volume of the inflatable structure, the stem defining a channel and a slot in fluid communication with one another and with the cavity, a coupling defining a first orifice, a second orifice, and a passage therebetween, the passage in fluid communication with the neck of the inflatable structure via the first orifice, and a pin releasably positionable in the slot, the pin in the slot controlling position of the funnel relative to the first orifice defined by the coupling.

In certain implementations, with the pin releasably positioned in the slot, the pin may maintain the stem in a filling position in which the funnel coupled to the stem is held away from the neck within the volume of the inflatable structure.

In some implementations, with the pin withdrawn from the slot, the stem is movable in a direction away from the volume of the inflatable structure such that the funnel coupled to the stem is movable into a seated position in the neck of the inflatable structure. In some instances, with funnel disposed in the neck of the inflatable structure, at least a portion of the funnel may be supported in the first orifice of the coupling.

In certain implementations, the valve may further include a stopper and a rod, the stopper disposed in the cavity of the funnel, and the rod coupled to the stopper and at least partially disposed in the channel of the stem. As an example, the rod and the stem may define an annulus along the channel such that condensate is movable from the funnel to the slot along the annulus and, with the pin withdrawn from the slot of the stem, the rod is axially movable along the channel. Further, or instead, the rod may be elastically deflectable by the pin releasably positioned in the slot of the stem. Additionally, or alternatively, with the pin releasably engaged in the slot of the stem, the rod may be axially movable along the channel of the stem. In some instances, the stopper may be symmetric about any plane including a center axis defined along a longitudinal dimension of the rod. For example, the stopper may be spherical, ovoid, or conical.

In some implementations, the first orifice of the coupling may be coupled to the neck of the inflatable structure.

In some implementations, the slot defined by the stem may be outside of the volume of the inflatable structure.

In certain implementations, the valve may further include a first retainer, the rod has a first end portion and a second end portion, the stopper is supported on the first end portion of the rod in the cavity of the funnel, the second end portion of the rod extends outside of the channel, the first retainer is coupled to the second end portion of the rod, and the first retainer is engageable with the stem to limit axial movement of the rod in a direction toward the cavity of the funnel. Further, or instead, the valve may include a second retainer, the stem has a first end region and a second end region, the first end region is coupled to the funnel, and the second retainer is coupled to the second end region of the stem with the rod movable through the second retainer, and the second retainer limits axial movement of the rod and the first retainer.

In some implementations, the system may further include a payload mechanically coupled to the valve.

In certain implementations, the system may further include a reactor defining a chamber, wherein the chamber is in fluid communication with the volume of the inflatable structure via the passage of the coupling with the pin supporting the funnel of the valve away from the first opening of the coupling and away from the neck of the inflatable structure. In some instances, the coupling may include a first portion and a second portion, the first portion defining the first orifice, the second portion defining the second orifice and, with the pin removed from the slot, the first portion and the second portion of the coupling are releasable from one another via buoyancy force of the inflatable structure with the first portion of the coupling moving with the inflatable structure and the second portion of the coupling remaining with the reactor.

BRIEF DESCRIPTION OF THE FIGURES

Like reference symbols in the various drawings indicate like elements

DETAILED DESCRIPTION

Embodiments will now be described more fully hereinafter with reference to the accompanying figures, in which exemplary embodiments are shown. The foregoing may, however, be embodied in many different forms and should not be construed as limited to the exemplary embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or," and the term "and" should generally be understood to mean "and/or."

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as including any deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples or exemplary language ("e.g.," "such as," or the like) is intended merely to explain the embodiments and does not pose a limitation on the scope of those embodiments. No language in the specification should be construed as indicating any unclaimed element as essential to the practice of the disclosed embodiments.

As used herein, the term "gas" or variants thereof (e.g., lifting gas) shall be understood to include a single component or multiple components (mixed), unless otherwise specified or made clear from the context. Further, unless a contrary intent is indicated, the use of the term gas shall be generally understood to include any multi-phase mixture that includes one or more gas phase components and exhibits characteristics of a compressible fluid, with a relationship between pressure, volume, and temperature that is accurately characterized by the ideal gas law to within about ±5 percent at room temperature at sea level. Thus, for example, a gas may include at least one gas phase component, as well as some amount of one or more vapor components (e.g., water vapor).

As used herein, the term "aerostat" shall be understood to include any one or more of various, different types of lighter-than-air aircraft that gain lift primarily from aerostatic lift, in contrast to aerodynes that primarily make use of aerodynamic lift requiring movement of a wing surface through air. In use cases described herein, an aerostat may contain a quantity of lifting gas such that the average density of the aerostat (containing the quantity of lifting gas) is less than or equal to the density of air at some altitude and, thus, the aerostat is at least neutrally buoyant in air for a period. Unmanned and unpowered aerostats are an important application for lifting gas and serve as useful examples for highlighting particular aspects of the devices, systems, and methods of the present disclosure. However, unless otherwise specified or made clear from the context, the term "aerostat" shall be understood to include any manner and form of object that can receive lifting gas to have at least some degree of buoyancy in air, whether in an indoor or an outdoor environment. Accordingly, as used herein, an aerostat may include any one or more of various, different manned or unmanned craft, dirigible or non-dirigible craft, independently propelled or floating craft, rigid or nonrigid craft, tethered or untethered craft, or combinations thereof. Further, it shall be understood that an aerostat includes at least an inflatable structure and may additionally include other elements, such as a payload and/or equipment for tethering to a payload. While this convention is used in the description that follows, it should generally be appreciated that the inflatable structure relates to other elements of launching systems in the same way that the aerostat relates to such launching systems. Thus, for the sake of reducing unnecessary repetition, launching the inflatable structure and/or detaching the inflatable structure as described herein may be used interchangeably with launching the corresponding aerostat and/or detaching the corresponding aerostat unless otherwise specified or made clear from the context.

For the sake of clear and efficient description, elements with numbers having the same last two digits in the disclosure that follows shall be understood to be analogous to or interchangeable with one another, unless otherwise explicitly made clear from the context, and, therefore, are not described separately from one another, except to note differences or to emphasize certain features.

Referring now to FIGS. 1 and 2A-2D, a system 100 may include a reactor 101 and an aerostat 202. The aerostat 202 may include an inflatable structure 203, a drain valve 204, a coupling 230, and a pin 232. The inflatable structure 203 may include a balloon 206 and a neck 207 collectively defining a volume 208. The coupling 230 may define a first orifice 241, a second orifice 242, and a passage 243 therebetween, with the passage 243 in fluid communication with the neck 207 of the inflatable structure 203 via the first orifice 241. The pin 232 may be releasably engageable with the drain valve 204 to control position of the drain valve 204 relative to the first orifice 241 defined by the coupling 230. For example, the drain valve 204 may include a funnel 212 and a stem 213 coupled to one another, with the funnel 212 defining a cavity 218 at least partially disposed in the volume 208 of the inflatable structure 203, and the stem 213 defining a channel 219 and a slot 244 in fluid communication with one another and with the cavity 218. The slot 244 may be defined by the stem 213 outside of the volume 208 of the inflatable structure 203 such that, as described in greater detail below, condensate (e.g., formed as steam in lifting gas condenses in the volume 208) may drain from volume 208 along a flow path at least partially defined by the channel 219 and the slot 244.

With the pin 232 releasably positioned in the slot 244 of the stem 213, the pin 232 may maintain the stem 213 in a filling position in which the funnel 212 coupled to the stem 213 is held away from the neck 207 as the inflatable structure 203 is being inflated. As an example, the reactor 101 may define a chamber 109 and, with the pin 232 releasably positioned in the slot 244 of the stem 213, the chamber 109 may be in fluid communication with the volume 208 of the inflatable structure 203 via the passage 243 of the coupling 230 and the neck 207 of the inflatable structure 203 such that a lifting gas 111 generated in the chamber 109 may move into the volume 208 to impart buoyancy to the inflatable structure 203. The pin 232 releasably engaged with the slot 244 of the stem 213—and, thus, supporting the funnel 212 in the filling position within the volume 208 of the inflatable structure 203 may, for example, reduce or even eliminate an oscillation of the drain valve 204 caused by variations in pressure build-up in the chamber 109 in which the lifting gas 111 is generated. This may reduce the potential for tearing the inflatable structure 203 during inflation. Additionally, or alternatively, as compared to a valve in a fixed position in a neck of the inflatable structure, the releasable engagement of the pin 232 in the slot 244 of the stem 213 hold the funnel 212 in the filling position away from the neck 207 of the inflatable structure 203 may facilitate dynamically positioning the funnel 212 to balance competing considerations associated with rapidly moving lifting gas 111 into the volume 208 to inflate the inflatable structure 203 while reducing the likelihood of unintended egress of the lifting gas 111 from the volume 208 after the inflatable structure 203 is inflated. Further, or instead, as compared to other types of actuation for dynamically positioning a portion of a drain valve of an inflatable structure, the pin 232 is lightweight, cost-effective, and manually operable with little or no training.

Figure 1:
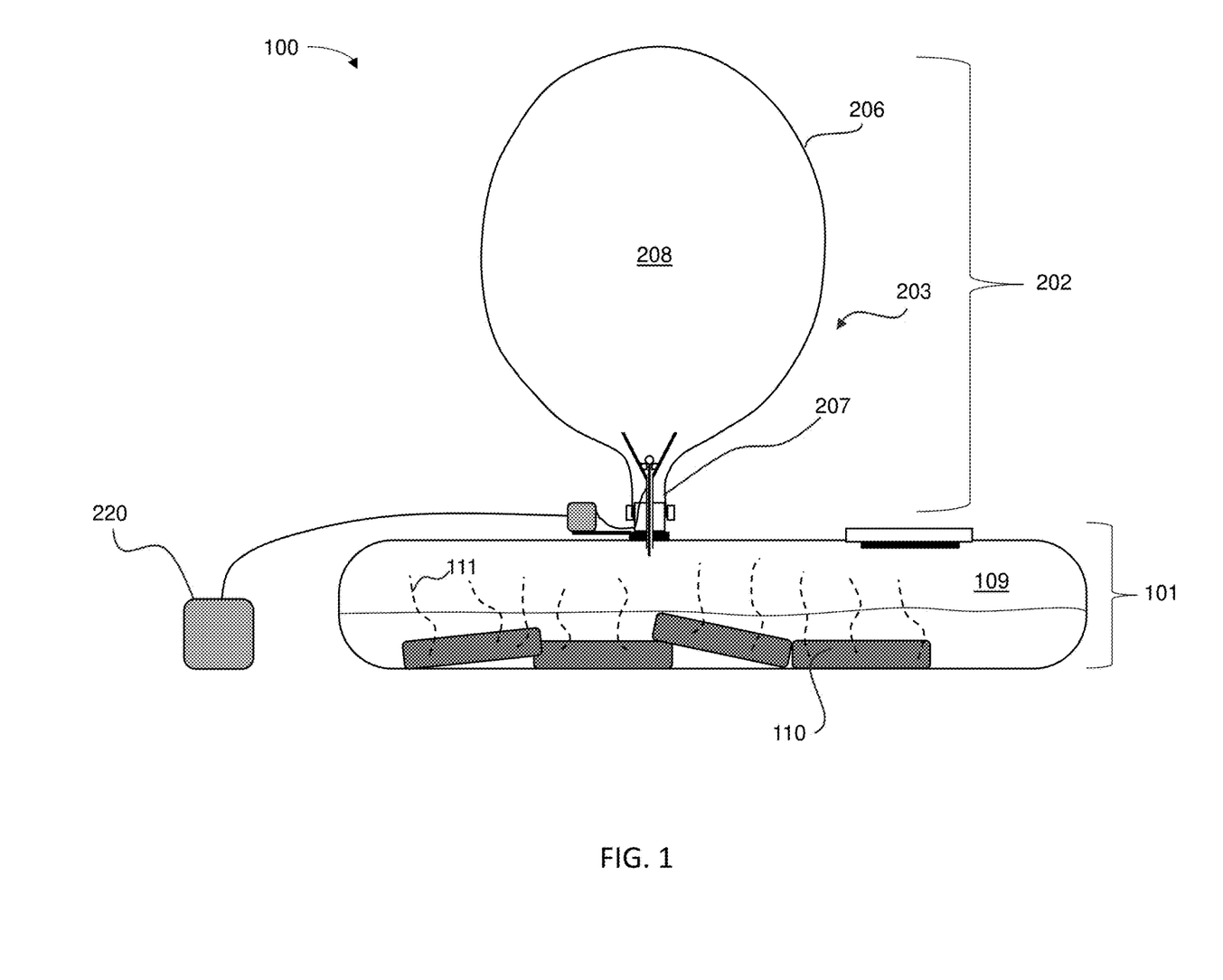
FIG. 1 is a schematic representation of a system for launching an aircraft, the system including a reaction chamber, an inflatable structure, a valve, and a coupling, the system shown with a payload attached to the valve.
Figure 2A:
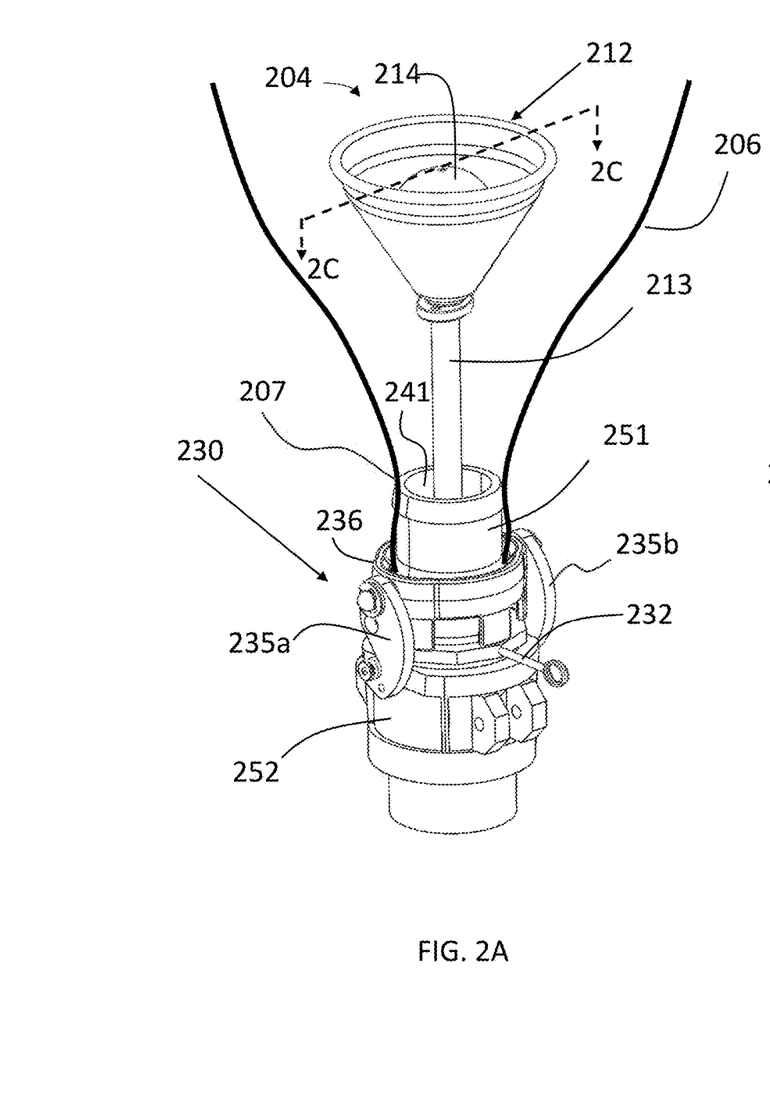
FIG. 2A is an isometric view of a portion of the system of FIG. 1 including the coupling, the valve, and a portion of the inflatable structure, shown in a filling position in which a pin secured to a stem of the coupling supports a funnel of the valve in a vertically displaced position relative to a first orifice of the coupling.
Figure 2B:
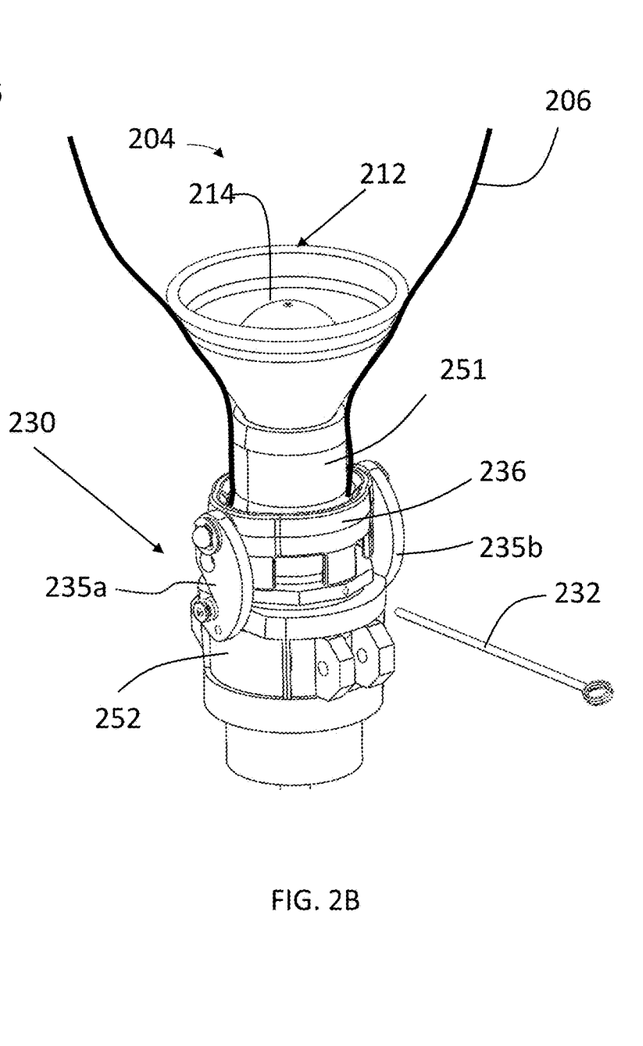
FIG. 2B is an isometric view of the portion of the system of FIG. 2A, shown in a closed position in which the pin released from the stem allows the funnel to move into a neck of the inflatable structure and into the first orifice of the coupling.

In use, activated aluminum 110 may be reacted with water in the chamber 109 of the reactor 101 to produce the lifting gas 111. With the pin 232 releasably engaged with the slot 244 of the stem 213—thus, holding the funnel 212 in the filling position away from the away from the neck 207 of the inflatable structure 203—the lifting gas may flow from the chamber 109 to the volume 208 of the inflatable structure 203. The activated aluminum 110 may include activated aluminum, such as set forth in U.S. Pat. No. 10,745,789, issued to Jonathan Thurston Slocum on Aug. 18, 2020, and entitled "Activated Aluminum Fuel," the entire contents of which are hereby incorporated herein by reference. While the lifting gas 111 is described herein as being produced from reaction of the activated aluminum 110 with water, it shall be understood that devices, systems, and methods of the present disclosure may be applied to any one or more of various, different types of lifting gases containing steam and produced at or near the point of end-use of the lifting gas. In the reaction of the activated aluminum 110 with water, about half the energy released goes to heat and half to generate hydrogen. As a result, typically about eight times as much steam is generated by volume than hydrogen. Thus, a large amount of extra lift in the aerostat 202 is possible if the inflatable structure 203 is filled quickly (before the steam condenses from the lifting gas 111) and sent aloft. Further, the time required to inflate the inflatable structure 203 with the lifting gas 111 may be important, or even critical, for launching the aerostat 202 to achieve desired objectives of a particular mission (e.g., rapidly acquiring observational data and/or evading detection at a launch site). Once the inflatable structure 203 is filled with the lifting gas 111, the pin 232 may be withdrawn (e.g., pulled by an actuator and/or manually) from the slot 244 such that tensile force on the stem 213 (e.g., force exerted by weight of a payload 220 coupled directly or indirectly to the drain valve 204) in a direction away from the volume 208 may move the funnel 212 into the seated position in the neck 207 of the inflatable structure 203 (e.g., with a portion of the neck 207 of the inflatable structure 203 coupled to the first orifice 241 of the coupling 230). In certain implementations, with the inflatable structure 203 is filled with the lifting gas 111, the aerostat 202 may be decoupled from the reactor 101. For example, when the inflatable structure 203 separates from the reactor 101, the inflatable structure 203 may immediately contact the funnel 212, as is useful for reducing the risk of the funnel 212 being inadvertently pulled through the neck 207 of the inflatable structure 203.

In some instances, the coupling 230 may have a first portion 251 and a second portion 252, with the first portion 251 defining the first orifice 241 and the second portion 252 defining the second orifice 242. The pin 232 releasably engaged with the slot 244 of the stem 213 may extend through the first portion 251 and the second portion 252 to hold the coupling 230 together. Continuing with this example, withdrawal of the pin 232 from the slot 244 of the stem 213 to allow the funnel 212 to move to the seated position in the neck 207 may also disengage the first portion 251 and the second portion 252 of the coupling 230 from one another. In some instances, with the pin 232 from the slot 244 of the stem 213, the first portion 251 and the second portion 252 of the coupling 230 may be releasable from one another via buoyancy force of the lifting gas 111 in the volume 208 of the inflatable structure 203. As an example, the inflatable structure 203 may be launched by releasing hold down arms 235a,b to release a collar 236 holding the inflatable structure 203 to the coupling 230. For example, the neck 207 of the inflatable structure 203 may be folded over to form a roll sock between the collar 236 and the coupling 230, and releasing the collar 236 may release the roll sock fold of the neck 207 to facilitate smooth release of the balloon 206 from the coupling 230. Further, or instead, with the first portion 251 and the second portion 252 of the coupling 230 disengaged from one another, the first portion 251 of the coupling 230 may move with the inflatable structure 203 and the second portion 252 of the coupling 230 may remain with the reactor 101.

In general, the drain valve 204 may be controlled between open and closed positions to control flight—namely, buoyancy and/or ballast—of the inflatable structure 203 floating in air under buoyancy force of the lifting gas 111 in the volume 208 of the inflatable structure 203. As compared to flight of an inflatable structure without a valve, the drain valve 204 controllable between the open and closed positions during flight may facilitate achieving longer periods and/or higher altitudes of flight through controlled release of condensed moisture (collected in the drain valve 204 as steam in the volume 208 condenses) that may act as ballast for the aerostat 202 but no longer provides lift to the aerostat 202.

Figure 2C:
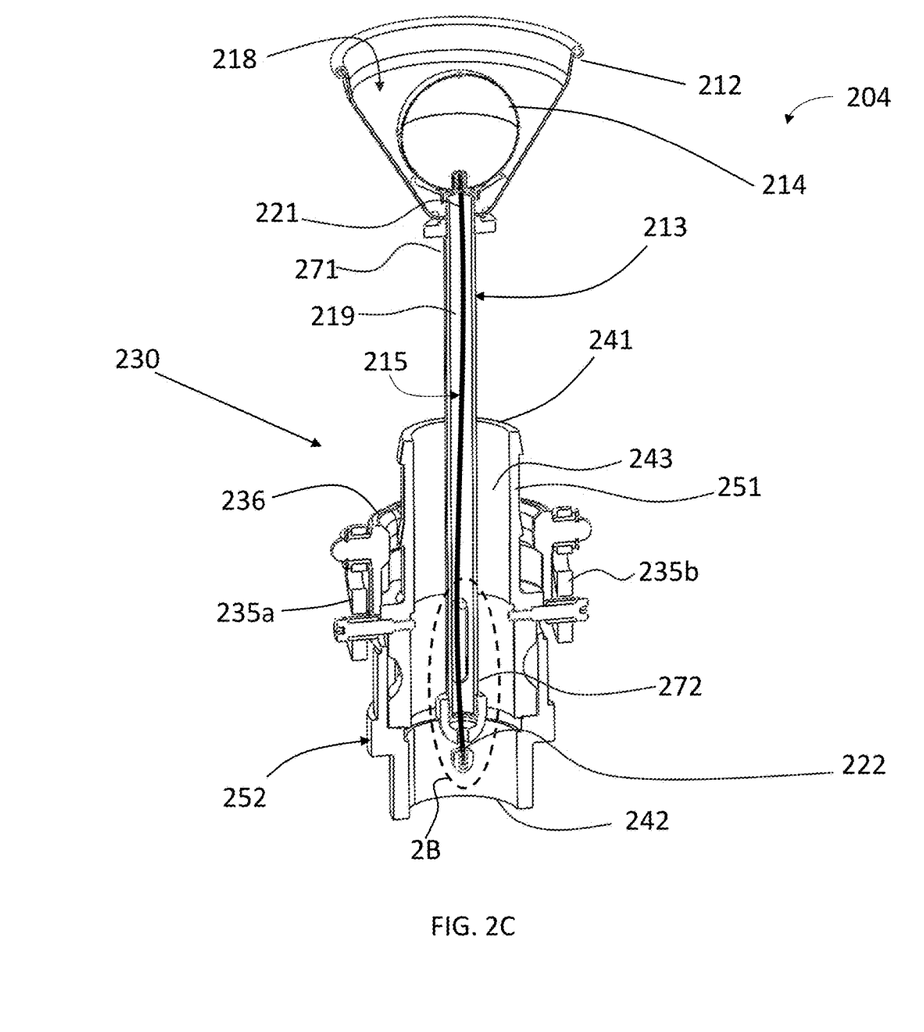
FIG. 2C is an isometric view of a cross section of the coupling and the valve of FIG. 2A, with the cross-section taken along 2C-2C in FIG. 2A.
Figure 2D:
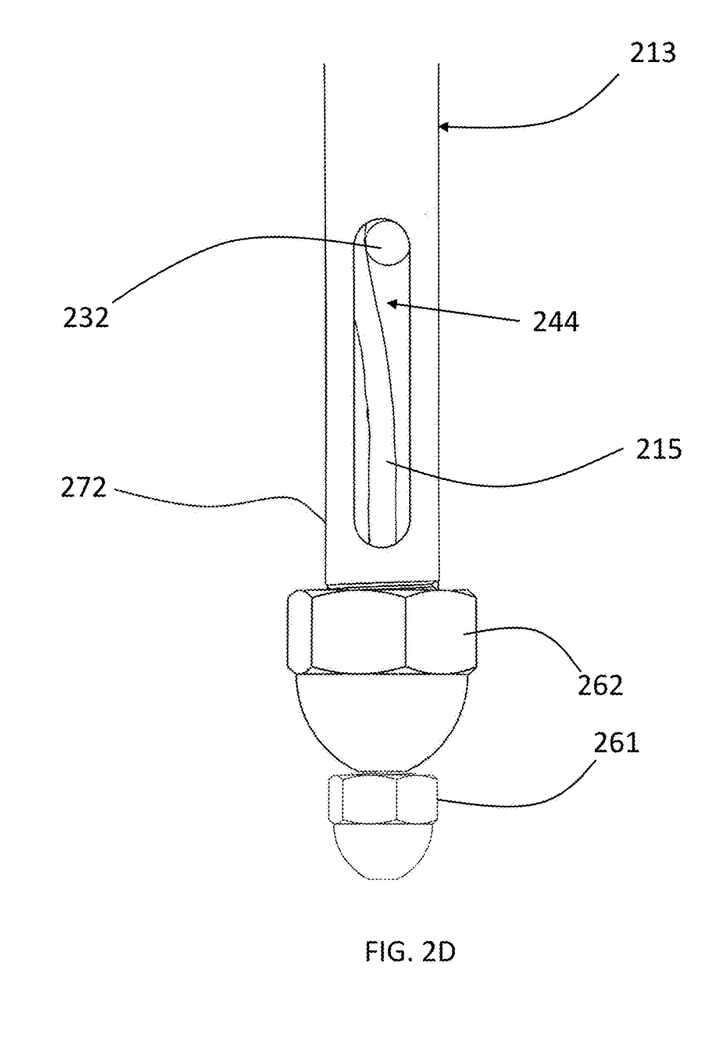
FIG. 2D is a closeup view of the coupling and the valve of FIG. 2A, shown along area of detail 2B in FIG. 2C, shown with the pin passing through a slot defined by a stem of the drain valve.

In certain implementations, the drain valve 204 may include the funnel 212, the stem 213, a stopper 214, and a rod 215. The stem 213 may define a channel 219, the stopper 214 may be disposed in the cavity 218 of the funnel 212, and the rod 215 may be coupled to the stopper 214 in the cavity 218. The stem 213 may be coupled to the funnel 212 either directly via a welded joint, or via a spaced block that the stem 213 may be screwed into or glued into to facilitate concentrically aligning the stem 213 with the funnel 212 itself.

In general, as the rod 215 moves axially within channel 219, the stopper 214 coupled to the rod 215 may undergo corresponding axial movement within the cavity 218 of the funnel 212. In particular, the axial movement of the stopper 214 within the cavity 218 of the funnel 212 may control fluid flowing from the cavity 218 into the channel 219. In certain implementations, with the funnel 212 seated in the neck 207 of the inflatable structure 203, the stopper 214 seated against the cavity 218 may form a gas-tight seal. Continuing with this example, condensate collected in the cavity 218 of the funnel 212 may float the stopper 214 in a direction away from the neck 207 such that at least some of the condensate may be expelled from the aerostat 202 by moving along a flow path from the cavity 218 of the funnel 212 to the slot 244 via the channel 219 of the stem 213.

In certain implementations, the rod 215 may have a first end portion 221 and a second end portion 222, with the stopper 214 supported on the first end portion 221 of the rod 215 in the cavity 218 of the funnel 212. For example, the rod 215 may be elongate (e.g., having a diameter of 1/8" or less) from the first end portion 221 to the second end portion 222. Additionally, or alternatively, a maximum outer dimension of the rod 215 may be less than a maximum inner dimension of the channel 219. That is, the rod 215 may move axially within the channel 219 with little or no contact with the stem 213 along the channel 219 to move the stopper 214 within the cavity 218 of the funnel 212. Further, or instead, as condensed moisture in the cavity 218 floats the stopper 214 in the funnel 212, condensed moisture in the volume 208 of the inflatable structure 203 may flow from the cavity 218 and along the channel 219 in an annulus defined between the stem 213 and the portion of the rod 215 disposed in the channel 219. Still further or instead, the slot 244 may be outside of the volume 208 of the inflatable structure 203 and in fluid communication with the channel 219 of the stem 213. Thus, as condensed moisture flows along the annulus defined between the stem 213 and the rod 215 along the channel 219, the condensed moisture may vent to the environment—and, thus, away from the aerostat 202—through the slot 244.

In some implementations, with the pin 232 releasably engaged in the slot 244 of the stem 213, the rod 215 may have radial clearance from the pin 232 and the stem 213 along the channel 219 such that the rod 215 may move freely within the stem 213. With such movement of the rod 215, condensate may drain down the annulus defined between the rod 215 and the stem 213 along the channel 219 even when the pin 232 is releasably engaged in the slot 244 of the stem 213. This may be useful for reducing the likelihood of initially launching the inflatable structure 203 with weight of condensate collected prior to launch and, thus, acting only as dead weight. Additionally, or alternatively, the rod 215 may be elastically deflectable by the pin 232 releasably positioned in the slot 244 of the stem 213 to facilitate draining condensate from the volume 208 of the inflatable structure 203, even when the pin 232 is in place.

In some implementations, the drain valve 204 may additionally, or alternatively, include a first retainer 261 (e.g., an acorn nut) supported on the second end portion 222 of the rod 215 outside of the channel 219 of the stem 213. The first retainer 261 may be engageable with the stem 213 to limit axial movement of the rod 215 in a direction toward the cavity 218 of the funnel 212. As an example, the first retainer 261 may have a maximum outer dimension (e.g., an outer diameter) larger than a maximum dimension of the channel 219 such that the rod 215 is unable to retract through the channel 219 of the stem 213. That is, geometric interference between the first retainer 261 and the stem 213 may limit the axial travel of the stopper 214 away within the cavity 218 of the funnel 212. As an example, the geometric interference between the first retainer 261 and the stem 213 may limit axial movement of the rod 215 such that the rod 215 is unable to retract through the channel 219 of the stem 213 in instances in which the stopper 214 rises in response to buoyant forces of condensed moisture collected in the cavity 218 of the funnel 212 while the drain valve 204 is in the seated position.

In some implementations, the drain valve 204 may include a second retainer 262. For example, the stem 213 may include a first end region 271 and a second end region 272, with the channel 219 defined therebetween. The first end region 271 of the stem 213 may be coupled to the funnel 212, and the second retainer 262 may be coupled to the second end region 272 of the stem 213. The rod 215 may be axially movable through the second retainer 262 with the second retainer 262 limiting axial movement of the rod 215 and the first retainer 261. The second retainer 262 may, for example, reduce the likelihood that one or more lanyard supporting a load may contact and/or restrict axial motion of the rod 215 and the first retainer 261.

In general, the stopper 214 may be any one or more of various different shapes complementary to the seat of the stopper 214 such that the stopper 214 and the funnel 212 (and/or a seal disposed therebetween) may form a line seal and/or an area seal. As an example, the stopper 214 may be symmetric about any plane including a center axis C defined along a longitudinal dimension of the rod 215. Such symmetry may be useful, for example, for facilitating assembly of the drain valve 204 and, further or instead, may facilitate robust operation of the drain valve 204 under challenging field conditions. Some examples of symmetric shapes of the stopper 214 include spherical, ovoid, and conical.

While systems have been described as having a pin that is manually removable from a coupling, other types of actuation may be additionally or alternatively used to remove the pin. Further, or instead, other types of actuation may be additionally or alternatively used to move the stem to move the funnel between the filling position and the seated position. Examples of actuation and additional or alternative aspects systems for launching aerostats are described in U.S. patent application Ser. No. 18/537,779, filed Dec. 12, 2023, entitled "ACTIVELY ACTUATABLE VALVES FOR AEROSTAT BUOYANCY CONTROL," the entire contents of which are hereby incorporated herein by reference.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the scope of the disclosure.

What is claimed is:

1. A system for launching an aerostat, the system comprising:
   an inflatable structure including a balloon and a neck collectively defining a volume;
   a drain valve including a funnel and a stem coupled to one another, the funnel defining a cavity at least partially disposed in the volume of the inflatable structure, the stem defining a channel and a slot in fluid communication with one another and with the cavity;
   a coupling defining a first orifice, a second orifice, and a passage therebetween, the passage in fluid communication with the neck of the inflatable structure via the first orifice; and
   a pin releasably positionable in the slot, the pin in the slot controlling position of the funnel relative to the first orifice defined by the coupling.

2. The system of claim 1, wherein, with the pin releasably positioned in the slot, the pin maintains the stem in a filling position in which the funnel coupled to the stem is held away from the neck within the volume of the inflatable structure.

3. The system of claim 1, wherein, with the pin withdrawn from the slot, the stem is movable in a direction away from the volume of the inflatable structure such that the funnel coupled to the stem is movable into a seated position in the neck of the inflatable structure.

4. The system of claim 3, wherein with funnel disposed in the neck of the inflatable structure, at least a portion of the funnel is supported in the first orifice of the coupling.

5. The system of claim 1, wherein the valve further includes a stopper and a rod, the stopper disposed in the cavity of the funnel, and the rod coupled to the stopper and at least partially disposed in the channel of the stem.

6. The system of claim 5, wherein the rod and the stem define an annulus along the channel such that condensate is movable from the funnel to the slot along the annulus and, with the pin withdrawn from the slot of the stem, the rod is axially movable along the channel.

7. The system of claim 5, wherein the rod is elastically deflectable by the pin releasably positioned in the slot of the stem.

8. The system of claim 5, wherein, with the pin releasably engaged in the slot of the stem, the rod is axially movable along the channel of the stem.

9. The system of claim 5, wherein the stopper is symmetric about any plane including a center axis defined along a longitudinal dimension of the rod.

10. The system of claim 9, wherein the stopper is spherical, ovoid, or conical.

11. The system of claim 1, wherein the first orifice of the coupling is coupled to the neck of the inflatable structure.

12. The system of claim 1, wherein the slot defined by the stem is outside of the volume of the inflatable structure.

13. The system of claim 1, wherein the valve further includes a first retainer, the rod has a first end portion and a second end portion, the stopper is supported on the first end portion of the rod in the cavity of the funnel, the second end portion of the rod extends outside of the channel, the first retainer is coupled to the second end portion of the rod, and the first retainer is engageable with the stem to limit axial movement of the rod in a direction toward the cavity of the funnel.

14. The system of claim 13, wherein the valve further includes a second retainer, the stem has a first end region and a second end region, the first end region is coupled to the funnel, and the second retainer is coupled to the second end region of the stem with the rod movable through the second retainer, and the second retainer limits axial movement of the rod and the first retainer.

15. The system of claim 1, further comprising a payload mechanically coupled to the valve.

16. The system of claim 1, further comprising a reactor defining a chamber, wherein the chamber is in fluid communication with the volume of the inflatable structure via the passage of the coupling with the pin supporting the funnel of the valve away from the first opening of the coupling and away from the neck of the inflatable structure.

17. The system of claim 16, wherein the coupling includes a first portion and a second portion, the first portion defining the first orifice, the second portion defining the second orifice and, with the pin removed from the slot, the first portion and the second portion of the coupling are releasable from one another via buoyancy force of the inflatable structure with the first portion of the coupling moving with the inflatable structure and the second portion of the coupling remaining with the reactor.

* * * * *